(12) United States Patent
Lee

(10) Patent No.: US 6,688,257 B2
(45) Date of Patent: Feb. 10, 2004

(54) PET DOG WASHING APPARATUS

(76) Inventor: Myung Chul Lee, 754 Samrak-Dong, Kimcheon-City, Kyongsangbuk-Do (KR)

( * ) Notice: Subject to any disclaimer, the term of this patent is extended or adjusted under 35 U.S.C. 154(b) by 0 days.

(21) Appl. No.: 10/131,457

(22) Filed: Apr. 23, 2002

(65) Prior Publication Data

US 2003/0196608 A1 Oct. 23, 2003

(51) Int. Cl.[7] .......................... A01K 13/00; A01K 29/00
(52) U.S. Cl. ...................... 119/671; 119/652; 119/668; 119/604; 119/606
(58) Field of Search .................... 119/603, 604, 119/606, 665, 658, 671, 656, 673, 609

(56) References Cited

U.S. PATENT DOCUMENTS

| | | | | |
|---|---|---|---|---|
| 3,831,559 A | * | 8/1974 | Hinrichs | 119/657 |
| 4,382,424 A | * | 5/1983 | Altissimo | 119/668 |
| 4,505,229 A | * | 3/1985 | Altissimo | 119/668 |
| 5,632,231 A | * | 5/1997 | Moore | 119/671 |
| 5,664,593 A | * | 9/1997 | McClain | 132/333 |
| 5,678,511 A | * | 10/1997 | Day | 119/676 |
| 6,302,122 B1 | * | 10/2001 | Parker et al. | 132/333 |
| 6,435,136 B1 | * | 8/2002 | Segura Munoz | 119/650 |

FOREIGN PATENT DOCUMENTS

| | | | | |
|---|---|---|---|---|
| EP | 1048208 A1 | * | 11/2000 | A01K/13/00 |
| JP | 08205704 A | * | 8/1996 | A01K/13/00 |

* cited by examiner

*Primary Examiner*—Son T Nguyen
(74) *Attorney, Agent, or Firm*—Norris McLaughlin & Marcus

(57) ABSTRACT

Provided are a batch-style or selective-style pet dog washing apparatus implemented by automatic control of a sensor and a driver, and a method for controlling the same. The apparatus includes a supporting base for placing a pet dog to be washed thereon and supporting the pet dog, a washer installed in the vicinity of the pet dog, for washing the pet dog by rubbing the same, a component controller for sensing the positions of the pet dog and the washer, adjusting the height of the supporting base according to the size of the pet dog, varying the position of the washer to get close to the pet dog, and actuating the washer, and a cleaning liquid/air supplier for supplying a cleaning liquid and air to the washer.

12 Claims, 7 Drawing Sheets

PET DOG WASHING APPARATUS

BACKGROUND OF THE INVENTION

1. Field of the Invention

The present invention relates to a batch-style or selective-style pet dog washing apparatus implemented by automatic control of a sensor and a driver, and a method for controlling the same.

2. Description of the Related Art

To bath a pet dog at home or a veterinary hospital, the pet dog is generally placed in a bathtub, and then washed and cleaned by the hand of a person. This task is, however, quite inconvenient and time-consuming.

To overcome these problems, there have been recently proposed various pet dog washing apparatuses.

A conventional pet dog washing apparatus performs a pet washing operation by operator's manual adjustment of the height of a bath floor and by supplying a cleaning liquid and water necessary for washing by means of a timer or according to adjustment for various steps of washing.

However, in the conventional pet dog washing apparatus, the size of a washer must be manually adjusted according to the size of a pet dog to be washed, and the temperature or mixture state of a cleaning liquid and water used for washing the pet dog must be controlled for every step of washing to be.

SUMMARY OF THE INVENTION

To solve the above-described problems, it is an object of the present invention to provide a pet dog washing apparatus in which various components of the apparatus can be automatically controlled according to the size of a pet dog to be washed, and a method for controlling the same.

It is another object of the present invention to provide a batch-style or selective-style pet dog washing apparatus using logic control for a washing, a driver for a pet dog supporting base and a cleaning liquid/air supplier.

To accomplish the first object of the present invention, there is provided a pet dog washing apparatus including a supporting base for placing a pet dog to be washed thereon and supporting the pet dog, a washer installed in the vicinity of the pet dog, for washing the pet dog by rubbing the same, a component controller for sensing the positions of the pet dog and the washer, adjusting the height of the supporting base according to the size of the pet dog, varying the position of the washer to get close to the pet dog, and actuating the washer, and a cleaning liquid/air supplier for supplying a cleaning liquid and air to the washer.

The pet dog washing apparatus may further include a selection controlling means for independently or simultaneously operating the component controller and/or the cleaning liquid/air supplier.

Also, the pet dog washing apparatus may further include a cover case installed to surround the washer and the supporting base to cover the whole body of the pet dog and constructed openably in the form of an open-top bag Here, the cover case extending upward from the bottom portion in a dome shape is cut halfway lengthwise to then be cut horizontally at portions closes to the lower end thereof, and the cover case having hinges provided at the lower portions of side walls thereof, and two handles and locking means installed where the halfway cut parts of the cover case contact each other.

Preferably, the bottom surface of the supporting base has a sloped floor unit for draining a cleaning liquid, and a drain pipe is connected to the bottom of the floor unit, thereby easily implementing drainage of the cleaning liquid after completing a washing operation.

According to an embodiment of the present invention, the washer includes a plurality of rubbing members for rubbing the pet dog to wash the same, an actuator which drives the plurality of rubbing members close to the pet dog, a frame for supporting the plurality of rubbing members and the actuator, and a moving means for scanning the frame back and forth with respect to the pet dog.

Here, each of the rubbing members may include a sliding arm having a cleaning liquid passage, a rubbing head coupled to an end of the sliding arm by a rotary sealing, and a normal and reverse rotation motor installed on the outer surface of the sliding arm and integrally formed with the rubbing head, the rubbing head including a buffer rubber having cleaning liquid spraying orifices connected to the cleaning liquid passage.

According to another embodiment of the present invention, the component controller may include a position sensor for sensing the size and position of the pet dog and the position of the washer, an analog-to-digital converter & signal amplifier for converting the analog signal sensed by the position sensor into a digital signal, a digital controller for performing an operation with respect to the signal supplied from the analog-to-digital converter & signal amplifier and outputting a control signal, and a digital-to-analog converter for converting the control signal of the digital controller into an analog signal and outputting the same.

Preferably, the position sensor includes a first position sensor for measuring the distance between the rubbing members getting closer to the pet dog and the pet dog, and a second position sensor for sensing the size and position of the pet dog, and the digital controller outputs control signals to the actuator of the washer, the normal and reverse rotation motor and a component controlling motor of the supporting base.

According to another embodiment of the present invention, the cleaning liquid/air supplier may include a cleaning liquid tank in which the cleaning liquid, hot water and cold water are mixed, a combined sensor for sensing the temperature and mixture ratio of the cleaning liquid stored in the cleaning liquid tank, an analog-to-digital converter & signal amplifier for converting the analog signal sensed by the combined sensor into a digital signal, a digital controller for performing an operation with respect to the signal supplied from the analog-to-digital converter & signal amplifier and outputting a control signal, a digital-to-analog converter for converting the control signal of the digital controller into an analog signal, a control valve unit responsible for controlling the supply of the cleaning liquid, hot water and cold water by the control signal of the digital controller, and a hydraulic cylinder and an air pump which are actuated by the digital controller and through which the cleaning liquid and air are supplied to the washer.

To accomplish the second object of the present invention, there is provided a method for controlling a pet dog washing apparatus including controlling the position of a pet dog to be washed, pre-washing the pet dog by spraying water to the pet dog while controlling the position of a washer to be closer to the pet dog, washing the pet dog by supplying a cleaning liquid from a cleaning liquid/air supplier and actuating the washer to rotate in normal and reverse directions, rinsing the pet dog by actuating the washer while supplying only water used for rinsing from the cleaning liquid/air supplier, and drying the pet dog by supplying only air from the cleaning liquid/air supplier.

Preferably, the controlling method according to the present invention may further include applying perfume to the pet dog with the cleaning liquid/air supplier and the washer turned off. Also, the controlling method may further include performing a massaging operation on the pet dog by actuating only the washer with the cleaning liquid/air supplier turned off.

In an embodiment of the present invention, the washer is scanned back and forth with respect to the pet dog.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Preferred embodiments of the present invention will now be described with reference to the accompanying drawings.

Figure 1:
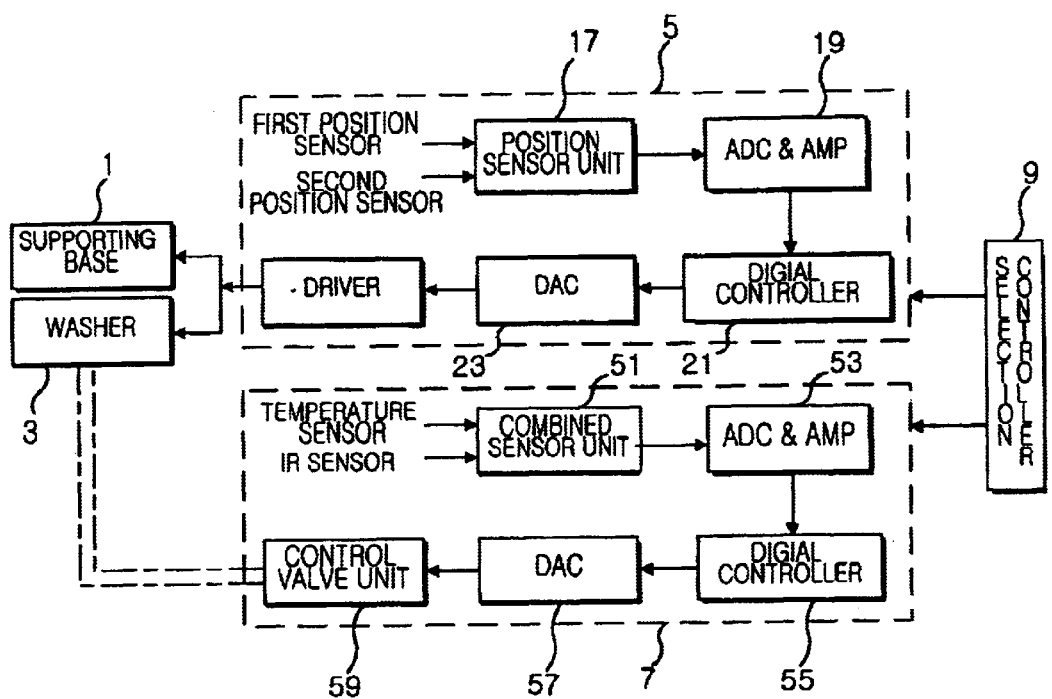
FIG. 1 is a block diagram of a pet dog washing apparatus according to the present invention.
Figure 2:
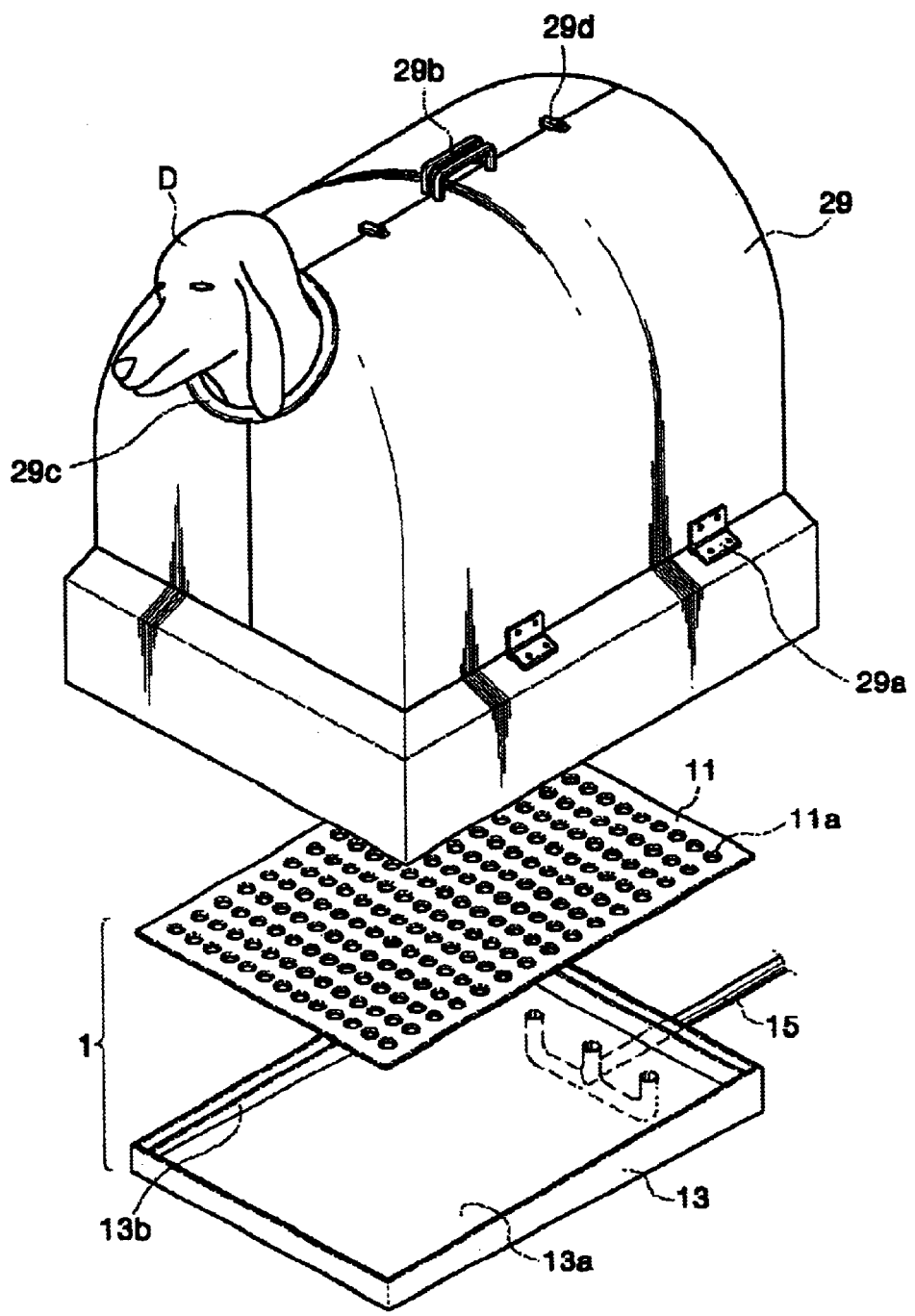
FIG. 2 is a perspective view showing the outer appearance of a supporting base and a washing device of the pet dog washing apparatus according to the present invention.
Figure 3:
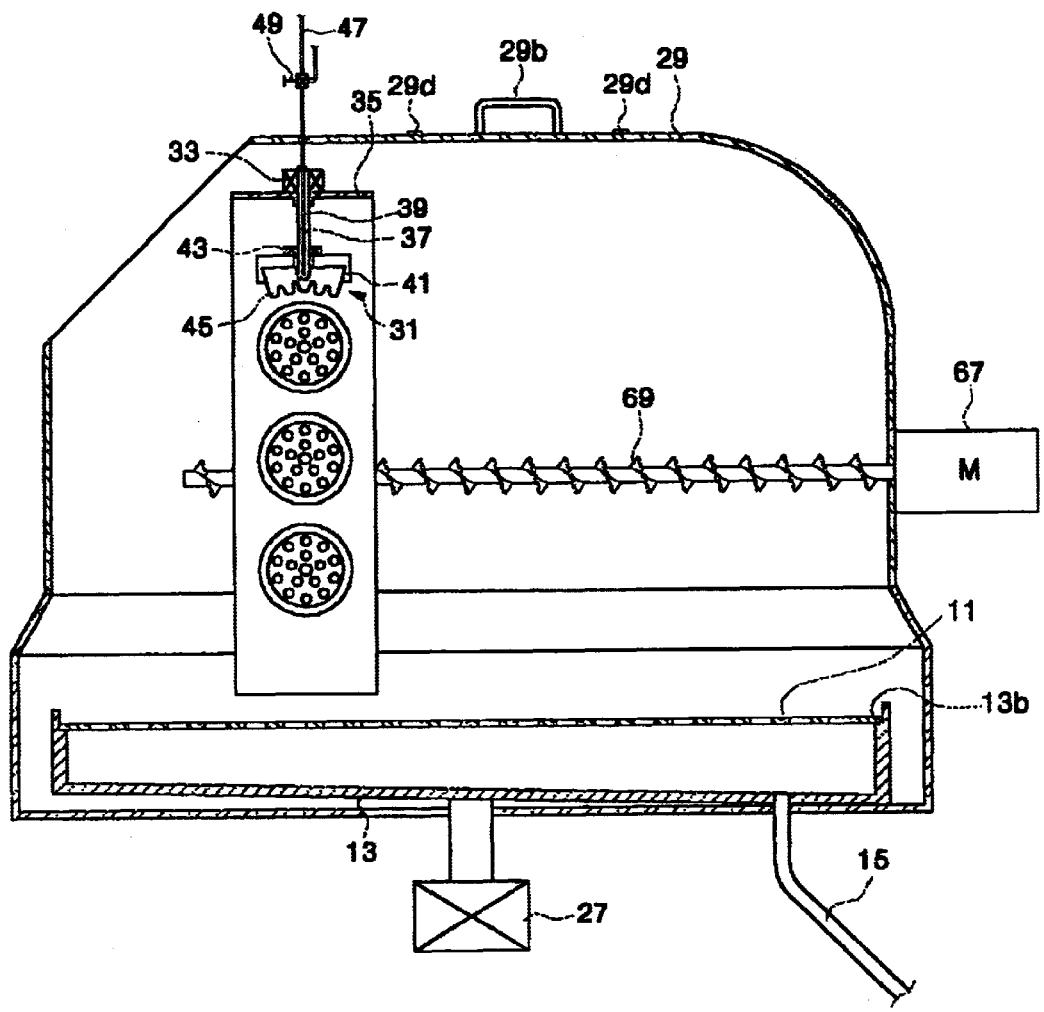
FIG. 3 is a side sectional view of FIG. 2.
Figure 4:
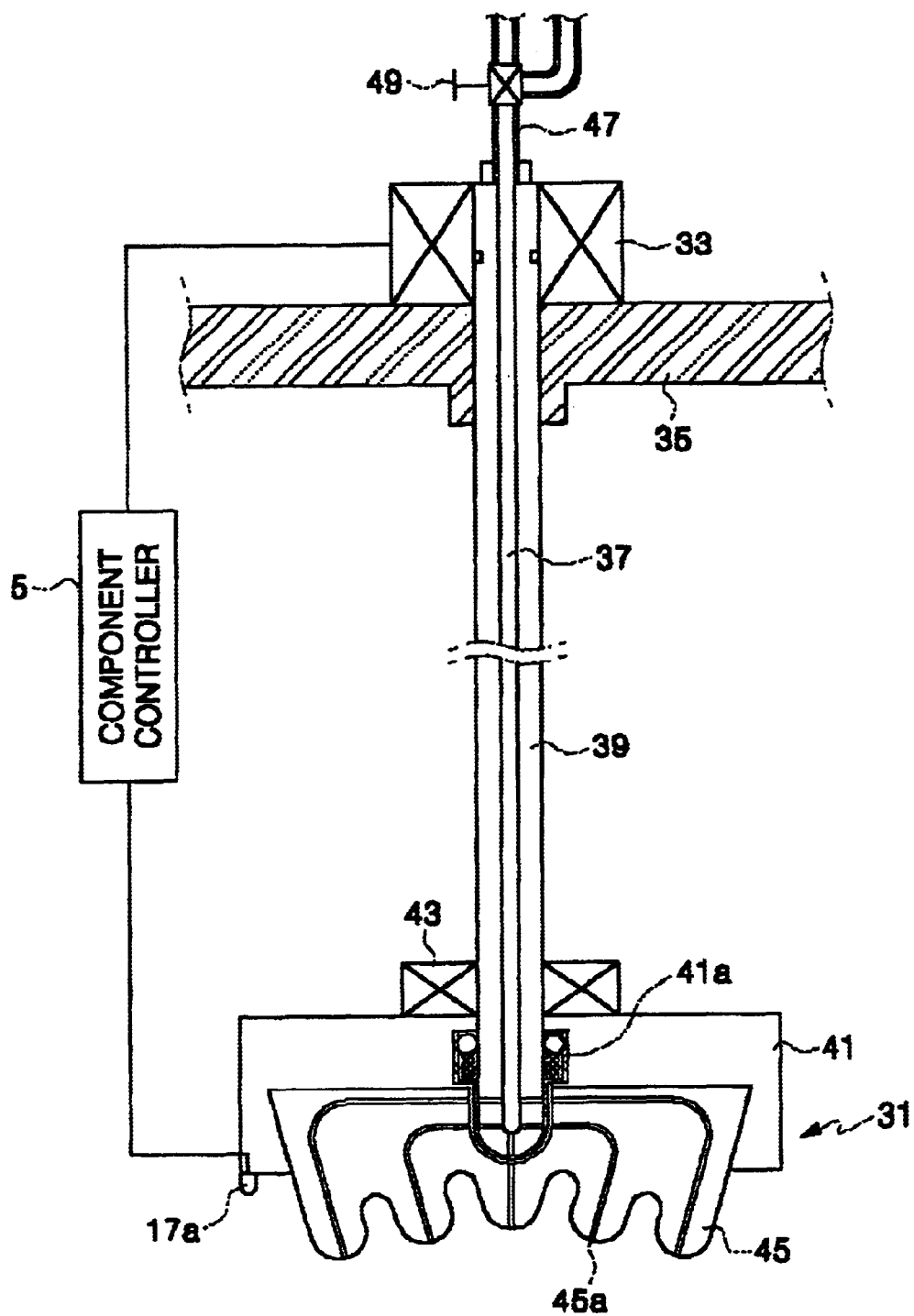
FIG. 4 is an enlarged cross-sectional view of the washer of the pet dog washing apparatus according to the present invention.

FIG. 1 is a block diagram of a pet dog washing apparatus according to the present invention. As shown in FIG. 1, the pet dog washing apparatus according to the present invention largely includes a supporting base 1 for placing a pet dog thereon and supporting the pet dog, a washer 3 for washing the pet dog, a component controller 5 for adjusting the height of the supporting base 1 according to the size of the pet dog to be washed, a cleaning liquid/air supplier 7 for supplying a cleaning liquid and air by controlling the physical amounts thereof, and a selection controller 9 for controlling independently or simultaneously the component controller 5 and the cleaning liquid/air supplier 7.

Here, the component controller 5 controls the washer 3 and the supporting base 1 based on signal information of a first position sensor for sensing the position of the washer 3 and a second position sensor for sensing the size and position of the pet dog to be washed.

FIGS. 2 through 5 are detailed diagrams showing the supporting base 1, the washing device 3, and the component controller 5 for controlling the supporting base 1 and the washing device 3.

As shown in the drawings, the supporting base 1 includes a drain plate 11 for placing a pet dog D to be washed, and a drain tray 13 installed under the drain plate 11 and having a sloped floor unit 13a for draining a cleaning liquid. A plurality of apertures 11a are formed in the drain plate 11 and a drain pipe 15 is connected to the bottom of the floor unit 13a of the drain tray 13, thereby easily implementing drainage of the cleaning liquid after completing a washing operation. The drain plate 11 may be integrated with the drain tray 13 or may be seated on and supported by a locking ledge 13b.

Figure 5:
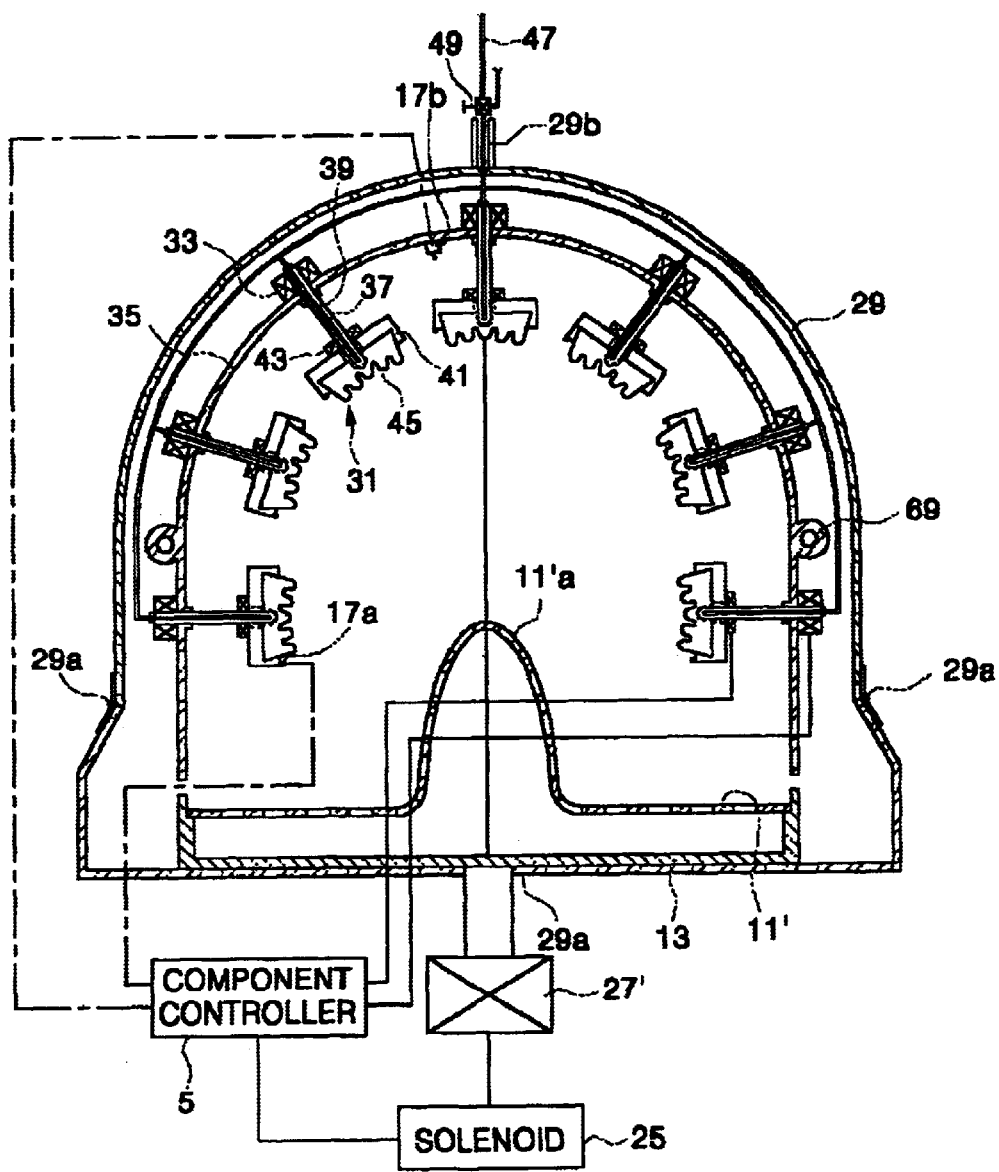
FIG. 5 is a front sectional view of FIG. 2.

In another embodiment of the present invention, a drain plate 11' shown in FIG. 5 may be used. The drain plate 11' includes an elevated mid-portion 11'a, around which the legs of the pet dog are placed and which substantially reaches the belly of the pet dog that steps thereon, facilitating the washing operation of the pet dog by preventing the pet dog from escaping or running away from the apparatus.

The above-described supporting base 1 is adjusted by means of the component controller 5 according to the size and position of the pet dog to be washed. To this end, there is provided a second position sensor 17b. A signal sensed by the second position sensor 17b is input to the component controller 5, as shown in FIG. 5.

The component controller 5 includes an ADC & AMP (analog-to-digital converter and signal amplifier) 19, a digital controller 21 and a DAC (digital-to-analog converter) 23. The ADC & AMP 19 converts an analog signal sensed by the second position sensor 17b into a digital signal and amplifies the converted signal. The digital controller 21 performs an operation with respect to the signal supplied from the ADC & AMP 19 and controls the same. The DAC 23 outputs a control signal to adjust the height of the supporting base 1.

The control signal output from the component controller 5 accurately controls a component controlling motor 27 (see FIG. 3) to adjust the height of the supporting base 1 according to the size of a pet dog to be washed. Also, the component controlling motor 27 may be constituted by a solenoid 25 and an elevating cylinder 27' (see FIG. 3). Here, the control signal output from the component controller 5 adjusts the operation of the solenoid 25, and the solenoid 25 accurately controls the flow of the elevating cylinder 27' installed in the lower portion of the supporting base 1, thereby adjusting the position of the pet dog to be washed according to the size of the pet dog.

In the present invention, a cover case 29 is further provided to cover the whole body of the pet dog D over the supporting base 1.

The cover case 29 is shaped of a close-bottom bag and has an opening through which the neck of the pet dog D extends outside, in its upper portion. Also, in order to allow the pet dog D to be easily mounted on or demounted from the supporting base 1, the cover case 29 is cut halfway lengthwise. The cover case 29 is constructed openably just like an open-top bag such that hinges 29a are provided at the lower portions of side walls of the cover case 29 and two handles 29b are installed where the halfway cut parts of the cover case 29 contact each other.

Also, in order to improve sealing between the portions contacting when the cover case 29 is closed after the pet dog is placed on the supporting base 1 in a state in which the cover case 29 is opened, a rubber packing is further provided. The handles 29b installed on the top portion of the cover case 29 are installed for the purposes of easy carriage and manageability. In particular, handles symmetrically disposed left and right are completed into a unified form when the two cut parts of the cover case 29 contact each other for closing the cover case. Ring-shaped locking means 29d are installed at an upper portion of the cover case 29 to prevent the cover case 29 from being opened once it is closed. Also, a protective liner 29c for protecting the neck of the pet dog D is provided along the periphery of the opening.

When the pet dog D in the cover case 29 is placed at a proper position by adjusting the position of the supporting base 1, the component controller 5 controls the washer 3 to be moved adjacent to the pet dog D.

In a preferred embodiment of the present invention, the washer 3 includes a plurality of rubbing members 31 for rubbing the pet dog to wash the same, an actuator 33 which drives the plurality of rubbing members 31 back and forth for moving the rubbing members 31 close to the pet dog D, a frame 35 for supporting the plurality of rubbing members 31 and the actuator 33, and a moving means for scanning the frame 35 back and forth with respect to the pet dog.

Each of the rubbing members 31 includes a sliding arm 39 having a cleaning liquid passage 37, a rubbing head 41 coupled to an end of the sliding arm 39 by a rotary sealing 41a, and a normal and reverse rotation motor 43 installed on the outer surface of the sliding arm 39 and integrally formed with the rubbing head 41. The rubbing head 41 includes a buffer rubber 45 having cleaning liquid spraying orifices 45a connected to the cleaning liquid passage 37.

The buffer rubber 45 is formed of an elastic rubber or synthetic resin to attaining a predetermined cushioning effect and a massage effect, and is detachably connected to the body of the rubbing head 41, thereby being easily replaced any time when it is worn away or broken.

The position of the above-described washer 3 is adjusted in a variable manner to get close to a to-be-washed pet dog placed at a proper position. To this end, a first position sensor 17a is installed at one side of the rubbing member 31. A signal sensed by the first position sensor 17a is input to the component controller 5.

Here, the component controller 5 converts the signal sensed by the first position sensor 17a into a digital signal by means of the ADC & AMP 19 to be input to the digital controller 21. The digital controller 21 performs an operation on the input signal to output a control signal by means of the DAC 23. As a result, the actuator 33 is driven to move back and forth, thereby moving the rubbing head 41 to get close to the pet dog.

When the rubbing head 41 gets closer to the pet dog, the component controller 5 drives the normal and reverse rotation motor 43 to rotate repeatedly in a normal direction and in a reverse direction, thereby performing washing.

The cleaning liquid, water and air are sprayed from one end of the rubbing head 41, through the cleaning liquid spraying orifices 45a of the buffer rubber 45. The cleaning liquid, water and air are supplied adaptively for each of washing, rinsing and drying steps. To this end, an opening/closing control valve 49 is installed on a supply line 47 connected to the cleaning liquid passage 37 of the sliding arm 39. The opening/closing control valve 49 is controlled by the cleaning liquid supplier 7 to be described below.

Figure 6:
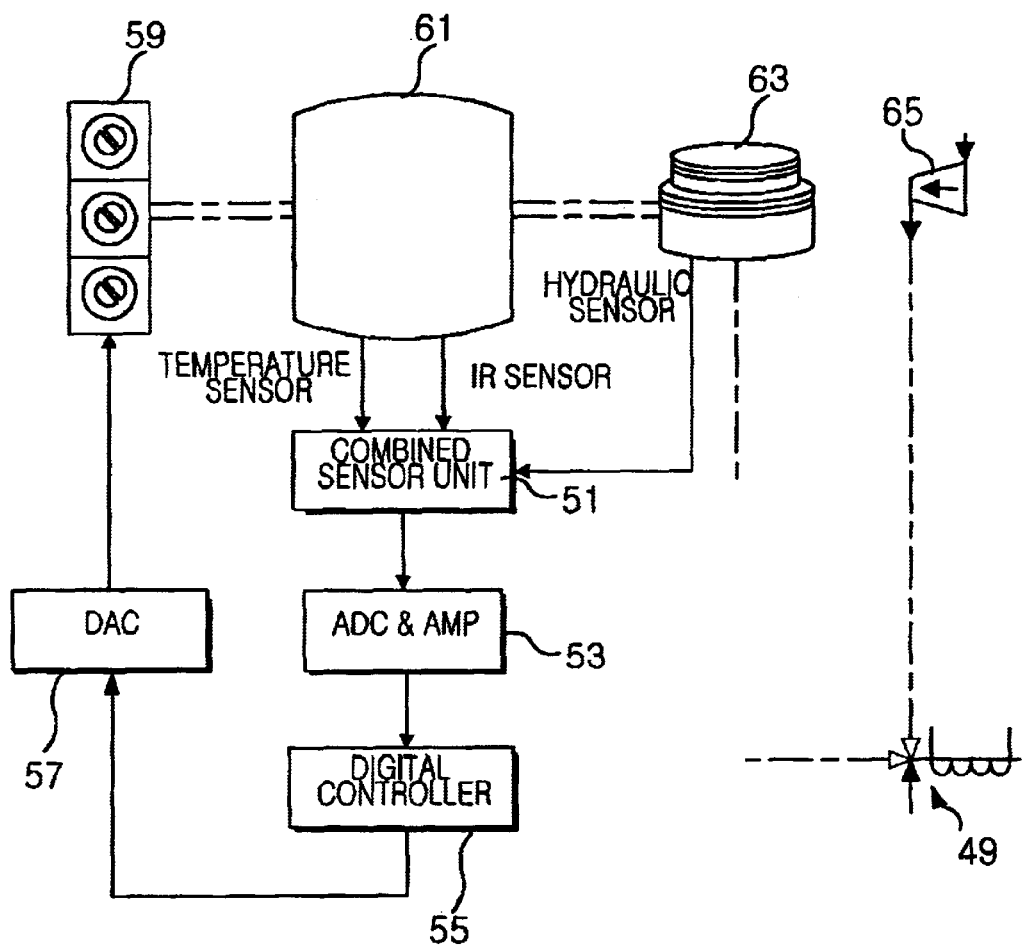
FIG. 6 is a schematic diagram of a cleaning liquid/air supplier of the pet dog washing apparatus according to the present invention.

FIG. 6 is a detailed diagram of the cleaning liquid/air supplier 7.

As shown in FIG. 6, the cleaning liquid/air supplier 7 includes a temperature sensor for sensing the temperature of a cleaning liquid for washing a pet dog and an IR sensor for sensing the state of the cleaning liquid, and also includes a combined sensor 51 for processing signals output from the IR sensor and the temperature sensor.

The combined sensor 51 senses the temperature and mixture ratio of a cleaning liquid stored in a cleaning liquid tank 61 to then transmit information on the temperature and mixture ratio to an ADC & AMP 53 for converting the information into a digital signal and amplifying the same. The converted digital signal is operated a digital controller 55 and is then output as a control signal by a DAC 57. As a result, the control signal controls a control valve unit 59 responsible for controlling the amounts of a cleaning liquid, hot water and cold water to adjust the temperature and mixture ratio of the cleaning liquid to optimum levels.

The cleaning liquid/air supplier 7 also includes a hydraulic cylinder 63 for supplying the cleaning liquid stored in the cleaning liquid tank 61 to the washer 3, and an air pump 65 through which air is supplied to the washer 3. A hydraulic sensor (not shown) is provided in the hydraulic cylinder 63 to supply the information obtained from the hydraulic sensor to the combined sensor 51.

The cleaning liquid, water and air supplied from the hydraulic cylinder 63 and the air pump 65 are transferred to the washer 3 through the supply line 47. The opening/closing control valve 49 installed in the middle of the supply line 47 controls the cleaning liquid, water and air to be selectively or simultaneously supplied by means of the digital controller 55.

The above-described washer 3 according to the present invention washes a pet dog by being operated to rotate in normal and reverse directions while spraying a cleaning liquid. Also, the washer 3 is scanned back and forth with respect to the pet dog to wash the whole body of the pet dog thoroughly. To this end, a motor 67 adjustably operated by the component controller 5 is installed at the exterior of the cover case 29, and a lead screw 69, which is drawn out from the motor 67 to be horizontally installed along the length of the pet dog, is installed to penetrate the frame 35 of the washer 3.

Thus, the washer 3 can perform a uniform washing operation while being scanned back and forth with respect to the pet dog. Here, one or more moving means may be installed.

Figure 7:
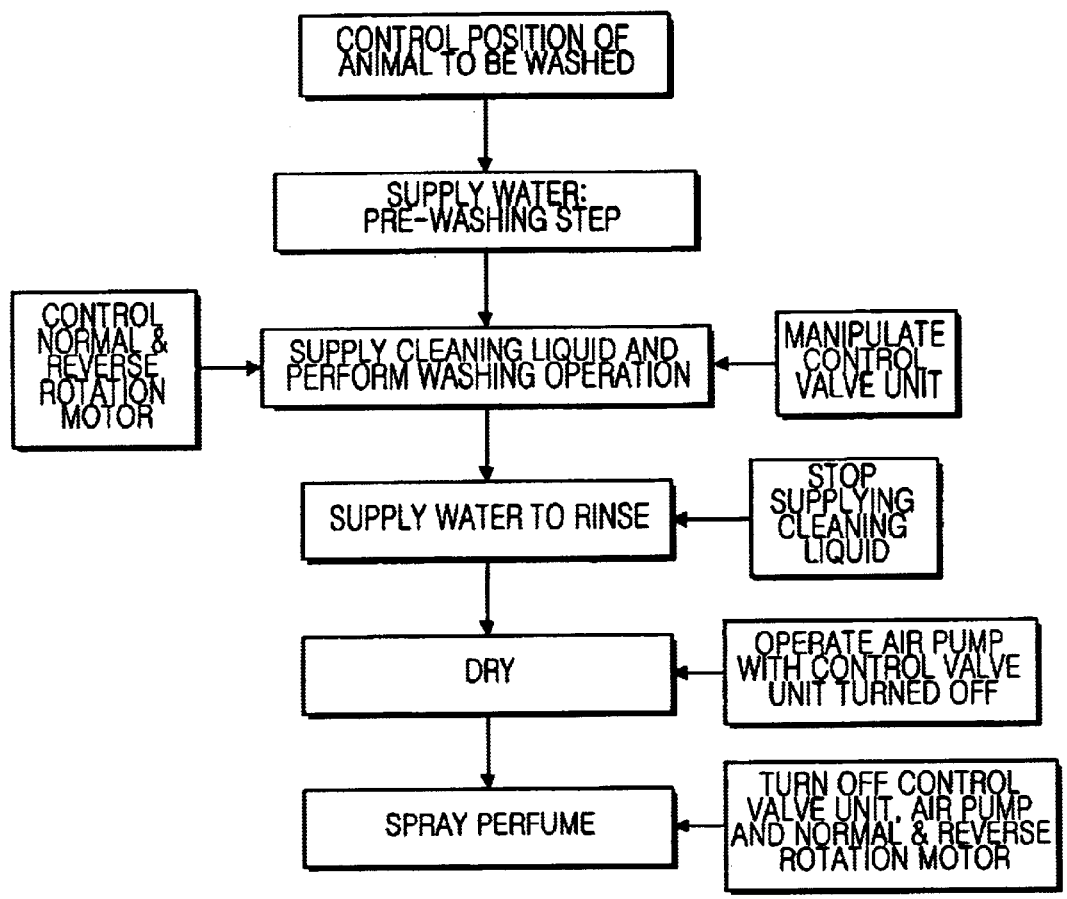
FIG. 7 is a sequence diagram of a method for controlling the pet dog washing apparatus according to the present invention.

The operation of the pet dog washing apparatus according to the present invention will now be described with reference to FIG. 7 showing the sequence of controlling the operation of the pet dog washing apparatus step by step.

First, the position of a pet dog to be washed is controlled. In this step, the position and height of the pet dog are controlled by manipulating the supporting base 1. Then, water used for washing is supplied. To this end, the control operation of supplying only water from the cleaning liquid/air supplier 7 is performed. At this time, the washer 3 performs an operation of varying the position of the washer 3 relative to the pet dog to be washed. Next, the control operation of supplying a cleaning liquid from the cleaning liquid/air supplier 7 is performed. At this time, the component controller 5 outputs a control signal for controlling the rubbing head 41 of the washer 3 to rotate in normal and reverse directions. Then, water used for rinsing is supplied. In this step, the control valve unit 59 controls only hot water and cold water to be supplied with the supply of a cleaning liquid interrupted. The rubbing head 41 of the washer 3 still repeats normal and reverse rotations. Subsequently, a drying step is performed. In this step, only high-pressure air is supplied from the air pump 65 with all elements of the control valve unit 59 interrupted, to perform the drying step.

Finally, a post-treatment step is performed by applying perfume to the pet dog with the hydraulic cylinder 63, the air pump 65 and the normal and reverse rotation motor 43 all turned off. According to the present invention, a massaging operation may be performed on the pet dog by operating only the normal and reverse rotation motor 43 with the hydraulic cylinder 63 and the air pump 65 turned off.

As described above, in the pet dog washing apparatus according to the present invention and the method for controlling the same, the mixture ratio and temperature of a cleaning liquid supplied externally can be automatically adjusted. Also, the washing procedure can be automatically selected and performed by adjusting appropriate amounts of a cleaning liquid, water and air used for washing and through sequential logic control.

Further, since the operations of all components of the pet dog washing apparatus according to the present invention are automatically controlled by means of sensors installed in the respective components, the pet dog can be washed easily and conveniently. Also, users can selectively perform in various desired manners by selection controlling means.

What is claimed is:

1. A pet dog washing apparatus comprising:
   a height adjustable supporting base for placing a pet dog to be washed thereon and supporting the pet dog;
   a washer installed in the vicinity of the pet dog, for washing the pet dog by rubbing the same;
   a component controller for sensing the positions of the pet dog and the washer, adjusting the height of the supporting base according to the size of the pet dog, varying the position of the washer to get close to the pet dog, and actuating the washer; and
   a cleaning liquid/air supplier for supplying a cleaning liquid and air to the washer, wherein the washer comprises:
      a plurality of rubbing members for rubbing the pet dog to wash the same;
      an actuator which drives the plurality of rubbing members close to the pet dog;
      a frame for supporting the plurality of rubbing members and the actuator; and
      a moving means for scanning the frame back and forth with respect to the pet dog.

2. The pet dog washing apparatus according to claim 1, further comprising a selection controlling means for independently or simultaneously operating the component controller and/or the cleaning liquid/air supplier.

3. The pet dog washing apparatus according to claim 1, further comprising a cover case installed to surround the washer and the supporting base to cover the whole body of the pet dog and constructed openably in the form of an open-top bag.

4. The pet dog washing apparatus according to claim 3, wherein the cover case extending upward from the bottom portion in a dome shape is cut halfway lengthwise to then be cut horizontally at portions closes to the lower end thereof, and the cover case having hinges provided at the lower portions of side walls thereof, and two handles and locking means installed where the halfway cut parts of the cover case contact each other.

5. The pet dog washing apparatus according to claim 1, wherein the bottom surface of the supporting base has a sloped floor unit for draining a cleaning liquid, and a drain pipe is connected to the bottom of the floor unit.

6. The pet dog washing apparatus according to claim 1, wherein the supporting base include a drain plate having a plurality of apertures.

7. The pet dog washing apparatus according to claim 6, wherein the drain plate has an upward protruding portion.

8. The pet dog washing apparatus according to claim 1, further comprising:
   a first position sensor for measuring the distance between the rubbing members getting closer to the pet dog and the pet dog; and
   a second position sensor for sensing the size and position of the pet dog.

9. The pet dog washing apparatus according to claim 1, wherein each of the rubbing members includes a sliding arm having a cleaning liquid passage, a rubbing head coupled to an end of the sliding arm by a rotary sealing, and a normal and reverse rotation motor installed on the outer surface of the sliding arm and integrally formed with the rubbing head, the rubbing head including a buffer rubber having cleaning liquid spraying orifices connected to the cleaning liquid passage.

10. The pet dog washing apparatus according to claim 1, wherein the component controller includes a position sensor for sensing the size and position of the pet dog and the position of the washer, an analog-to-digital converter & signal amplifier for converting the analog signal sensed by the position sensor into a digital signal, a digital controller for performing an operation with respect to the signal supplied from the analog-to-digital converter & signal amplifier and outputting a control signal, and a digital-to-analog converter for converting the control signal of the digital controller into an analog signal and outputting the same.

11. The pet dog washing apparatus according to claim 10, wherein the position sensor includes a first position sensor for measuring the distance between the rubbing members getting closer to the pet dog and the pet dog, and a second position sensor for sensing the size and position of the pet dog, and the digital controller outputs control signals to the actuator of the washer, the normal and reverse rotation motor and component controlling motor of the supporting base.

12. The pet dog washing apparatus according to claim 1, wherein the cleaning liquid/air supplier includes a cleaning liquid tank in which the cleaning liquid, hot water and cold water are mixed, a combined sensor for sensing the temperature and mixture ratio of the cleaning liquid stored in the cleaning liquid tank, an analog-to-digital converter & signal amplifier for converting the analog signal sensed by the combined sensor into a digital signal, a digital controller for performing an operation with respect to the signal supplied from the analog-to-digital converter & signal amplifier and outputting a control signal, a digital-to-analog converter for converting the control signal of the digital controller into an analog signal, a control valve unit responsible for controlling the supply of the cleaning liquid, hot water and cold water by the control signal of the digital controller, and a hydraulic cylinder and an air pump which are actuated by the digital controller and through which the cleaning liquid and air are supplied to the washer.

* * * * *